United States Patent [19]

Althaus et al.

[11] Patent Number: 5,060,377
[45] Date of Patent: Oct. 29, 1991

[54] SHAVER HEAD WITH FLOW PASSAGES

[75] Inventors: Wolfgang Althaus, Wuppertal; Michael Schwarz, Herne, both of Fed. Rep. of Germany

[73] Assignee: Wilkinson Sword GmbH, Solingen, Fed. Rep. of Germany

[21] Appl. No.: 567,819

[22] Filed: Aug. 15, 1990

[30] Foreign Application Priority Data

Aug. 16, 1989 [DE] Fed. Rep. of Germany ... 8909759[U]

[51] Int. Cl.$^5$ .............................................. B26B 21/00
[52] U.S. Cl. .......................................... 30/50; 30/48; 30/49
[58] Field of Search ................................ 30/48, 49, 50

[56] References Cited

U.S. PATENT DOCUMENTS

| | | | |
|---|---|---|---|
| 1,803,177 | 4/1931 | Ericsson | 30/49 |
| 3,890,704 | 6/1975 | Ferraro | 30/47 |
| 4,403,413 | 9/1983 | Trotta | 30/50 |
| 4,443,939 | 4/1984 | Motta et al. | 30/50 |
| 4,624,051 | 11/1986 | Apprille, Jr. et al. | 30/50 |
| 4,641,429 | 2/1987 | Abatemarco | 30/50 |
| 4,679,324 | 7/1987 | Kirk | 30/50 |
| 4,690,018 | 9/1987 | Duncan | 30/50 |
| 4,813,131 | 3/1989 | Gruner | 30/50 |
| 4,831,731 | 5/1989 | Eltis | 30/50 |
| 4,932,122 | 6/1990 | Shurland et al. | 30/50 |
| 4,976,028 | 12/1990 | Chen | 30/50 |

FOREIGN PATENT DOCUMENTS

| | | |
|---|---|---|
| 2746372 | 4/1978 | Fed. Rep. of Germany . |
| 2750796 | 5/1978 | Fed. Rep. of Germany . |
| 3315635 | 12/1984 | Fed. Rep. of Germany . |
| 647450 | 1/1985 | Switzerland . |
| 2009017 | 6/1979 | United Kingdom . |
| 2055069 | 2/1981 | United Kingdom . |

Primary Examiner—Mark Rosenbaum
Assistant Examiner—Hwei-Siu Payer
Attorney, Agent, or Firm—Finnegan, Henerson, Farabow, Garrett & Dunner

[57] ABSTRACT

The invention relates to a shaver head for a wet shaver in which a single or double razor blade is arranged in a plastic housing including a front guide strip. The plastic housing has perforations both on the underside and at the rear which are respectively connected to an open region of the plastic housing at the cutting edge of the razor blade.

7 Claims, 3 Drawing Sheets

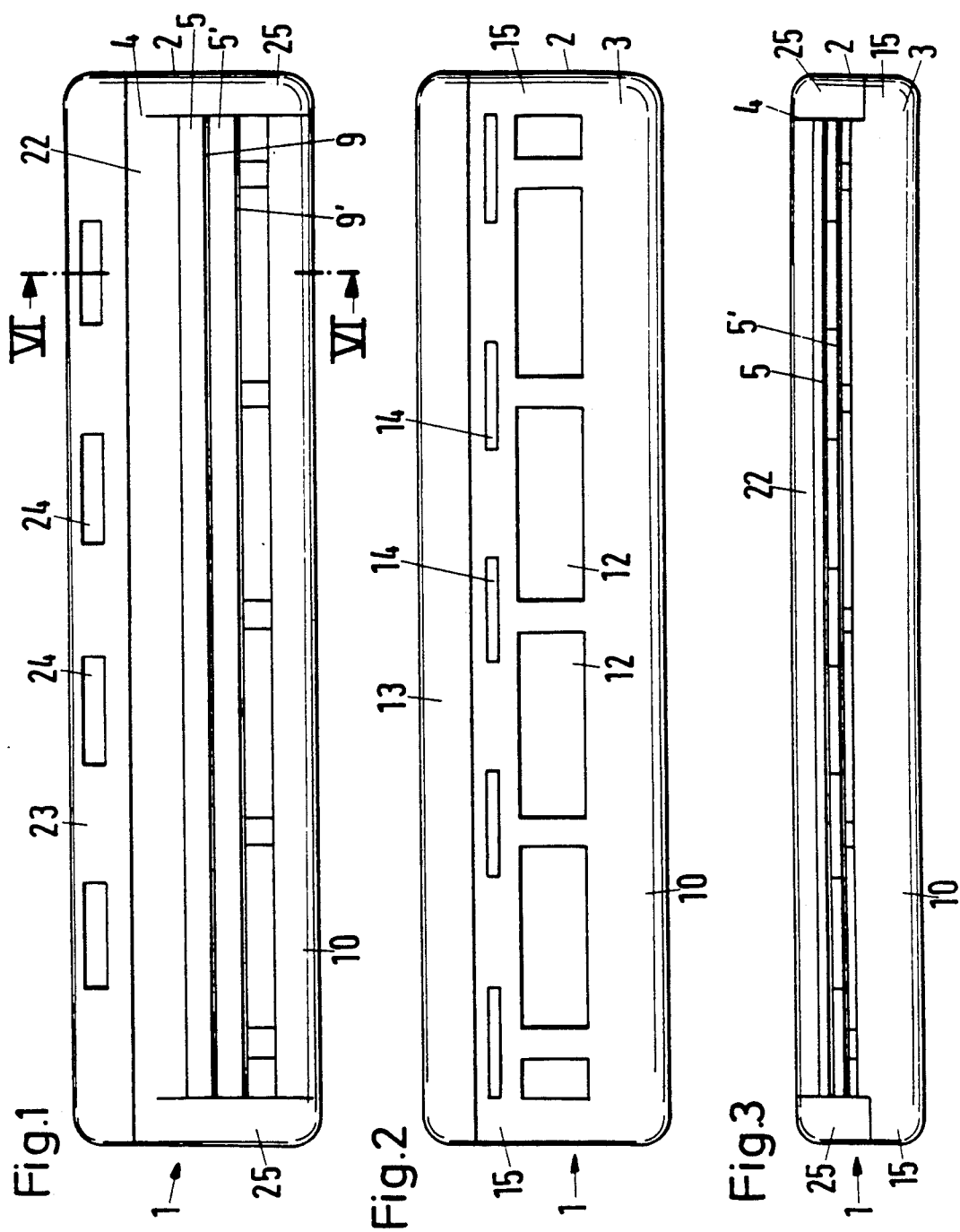

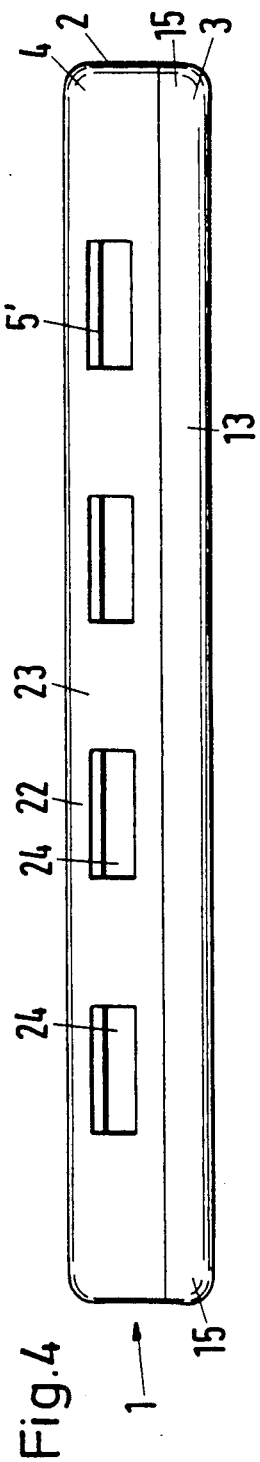
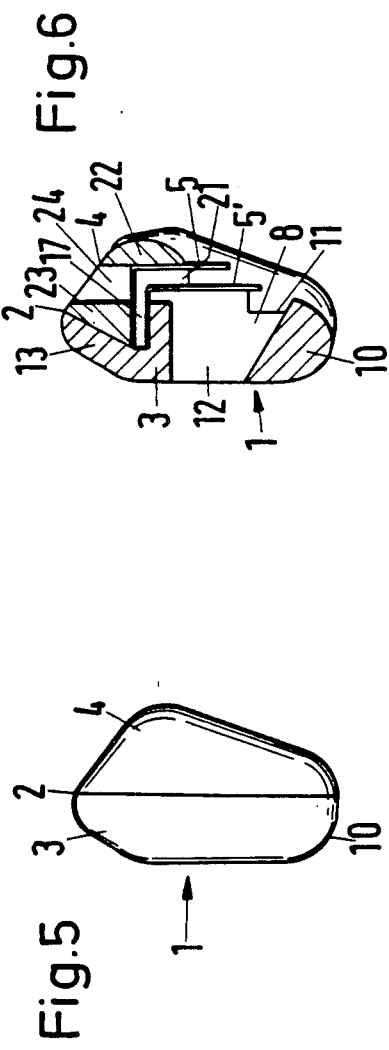
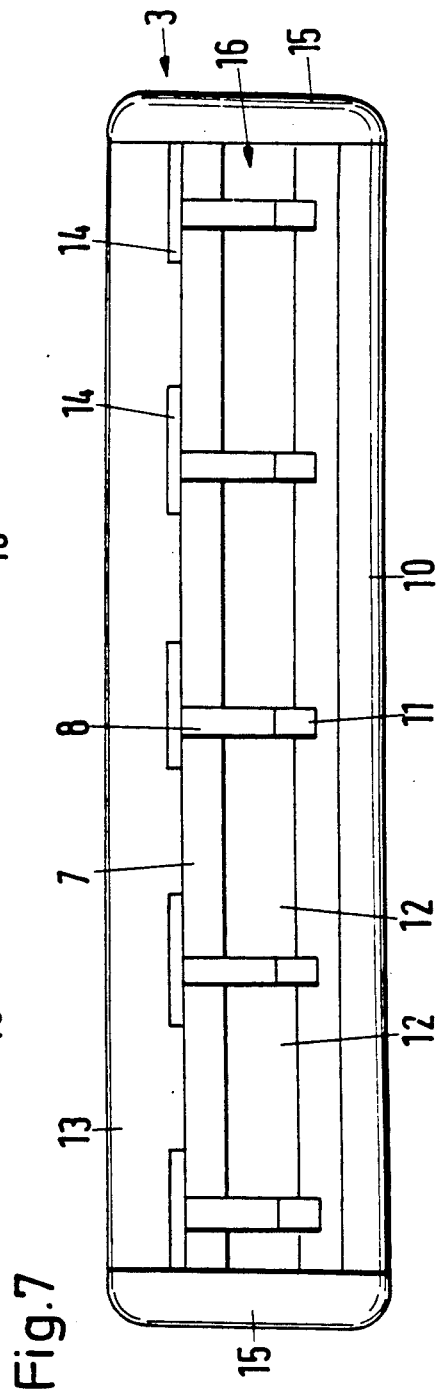

SHAVER HEAD WITH FLOW PASSAGES

BACKGROUND OF THE INVENTION

1. Field of the Invention

The present invention relates to a shaver head for a wet shaver. The shaver head is arranged at the front end of a handle and has a single or double razor blade arranged in a plastic housing having perforations and a front guide strip.

2. Description of Related Art

In conventional wet shavers, a single or double razor blade is permanently embedded in a plastic housing in the shaver head. If the shaver head is constructed separately from the handle and is fastened to a handle by interlocking elements, the shaver head is known as a razor blade unit.

Shaver heads commonly have perforations in the plastic housing to allow shaving foam to flow through the plastic housing and to prevent the shaving foam from collecting inside the plastic housing. These perforations also help in efforts to clean the shaver head after shaving has been completed.

However, perforations in known shaver heads do not operate with complete satisfaction because they do not allow an optimum flow of shaving foam though the shaver head during shaving. This has been found to be particularly a problem with known shaver heads which are razor blade units that are detachable from the razor handle.

Moreover, it is impossible to thoroughly clean known shaver heads after shaving. Despite the presence of perforations in conventional plastic housings, soap residue remains trapped within the housing, because shaving foam is not completely rinsed out through the perforations.

SUMMARY OF THE INVENTION

It is an object of the present invention to improve the arrangement of the perforations in a shaver head, in particular in a razor blade unit of a wet shaver.

Additional objects and advantages of the invention will be set forth in part in the description which follows and in part will be obvious from the description or may be learned by practice of the invention. The objects and advantages of the invention may be realized and attained by means of the instrumentalities and combinations particularly pointed out in the appended claims.

To achieve these objects, the invention provides a plastic housing having perforations both on the underside and at the rear, which are connected to an open region of the plastic housing at the cutting edges of the razor blades.

This arrangement provides a shaver head with an optimum arrangement of perforations. These perforations proceed from the region of the cutting edges of the razor blades and are continuous. Such an arrangement guarantees optimum flow of shaving foam through the shaving head and optimizes cleaning efforts by preventing soap residue from gathering inside the plastic housing.

The perforations on the underside of the housing preferably are formed by intermediate spaces between webs which connect a guide strip to the remainder of the plastic housing. In this way, it is possible to create a flow area with an optimum cross-section in the region of the underside perforations.

The guide strip preferably is beveled backwards along its rear side, starting from its top side. This bevel defines a flow channel running obliquely backwards and downwards.

To prevent shaving foam and soap residue from piling up and collecting in inaccessible crevices, the webs preferably have recesses on a top side in a region behind the guide strip.

In the preferred embodiment, the invention provides a blade block formed from a strip with an essentially L-shaped cross-sectional profile. The two legs of the L-shaped strip are preferably perpendicular to one another.

The razor blades are fastened parallel to one leg of the L-shaped strip. The L-shaped strip is formed by short strip portions. These strip portions are connected to one another by webs in the region of the other leg of the strip. Openings between the strip portions are aligned with the perforations in the bottom part at the rear of the plastic housing. In this way, perforations at the rear are created in a simple fashion.

In the case of a razor having a double razor blade arrangement, the two razor blades are arranged on both sides of one leg of the strip, so that the gaps between the strip portions define openings which are connected to the perforations at the rear of the plastic housing. Consequently, during shaving, the shaving foam can travel through the gaps between the two razor blades, thus improving the overall shaving properties of the razor.

The strip portions preferably are connected to one another in a region of the free ends of the legs by the webs. In such an arrangement, the openings defined by mutually neighboring strip portions provide an optimum flow cross-section. The webs which connect the front guide strip to the remainder of the plastic housing are located in front of the strip portions. This is has the advantage of minimizing the resistance to flow caused by the strip portions and by the webs.

To further improve the shaving properties, the shaver head is provided with a friction-reducing slide strip. The slide strip is arranged parallel to the cutting edges of the razor blades and is formed of water-soluble or water-insoluble polymers.

It is to be understood that both this general description and the following detailed description are exemplary and explanatory only and are not restrictive of the invention as claimed.

BRIEF DESCRIPTION OF THE DRAWINGS

The accompanying drawings which are incorporated in and constitute a part of the specification illustrate the embodiments of the invention, and together with the description, serve to explain the objects, advantages and principles of the invention.

FIG. 1 is a top view of the razor blade unit;

FIG. 2 is a bottom view of the razor blade unit;

FIG. 3 is a front view of the razor blade unit;

FIG. 4 is a rear view of the razor blade unit;

FIG. 6 is a partial cutaway along the line VI—VI of FIG. 1;

FIG. 7 is a top view of the bottom part of the plastic housing of the razor blade unit;

DESCRIPTION OF THE PREFERRED EMBODIMENTS

Embodiments of the present invention will be described with reference to the drawings.

Figure 9:
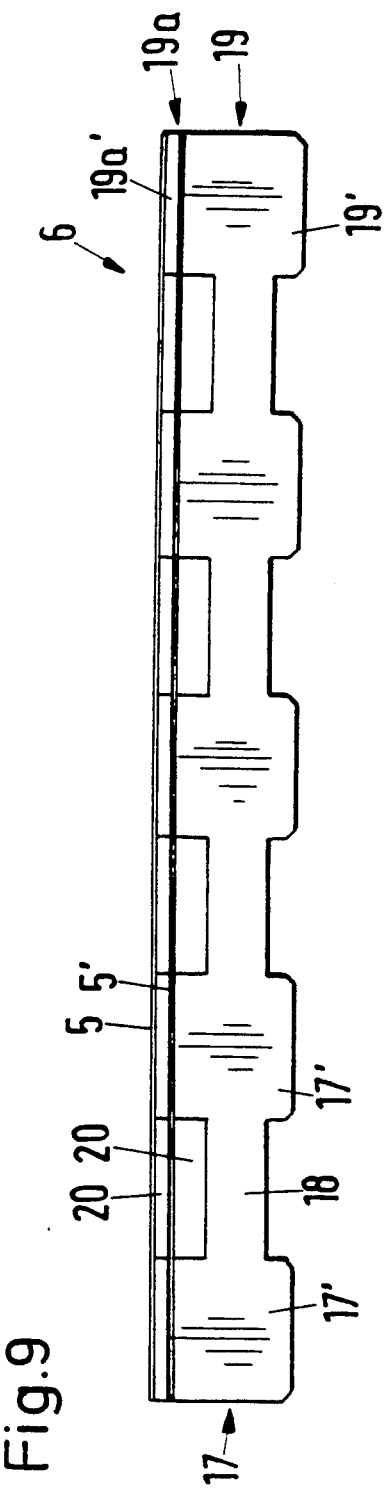
FIG. 9 is a front view of the blade block.

A razor blade unit 1 includes a plastic housing 2. Plastic housing 2 includes a bottom part 3 and an upper alignment strip 4, which are permanently connected to one another and which locate firmly between themselves a blade block 6 carrying razor blades 5, 5' (FIG. 9). Alignment strip 4 and bottom part 3 may be connected together by methods such as bonding or ultrasonic welding, or by using frictionally engaged pins and bores.

The bottom part 3 of plastic housing 2 as shown in FIG. 7 has a central middle web 7 which extends in a longitudinal direction, and spaced integral thereon are support webs 8 which extend perpendicular to the longitudinal extent of the cutting edges 9, 9' of the two razor blades 5, 5'. These support webs 8 carry at the front free end a guide strip 10 whose front surface is rounded off. In this arrangement, the support webs 8 include recesses 11 formed in the region behind the guide strip 10.

Perforations 12 are defined in the regions between mutually neighboring support webs 8 and between the middle web 7 and the guide strip 10, as seen, in particular, in the top view in accordance with FIG. 7 and the bottom view in FIG. 2. A rear wall 13 extends parallel to the middle web 7, on the side opposite the guide strip 10. Wall 13 is beveled downwards towards the middle web 7. In this arrangement, recesses are located between the middle web 7 and the rear wall 13. The recesses are in the form of longitudinal slots 14 which serve to receive the blade block 6. The bottom part 3 of the plastic housing 2 further includes side walls 15.

The support webs 8 of the bottom part 3 of the plastic housing 2 form a blade platform 16 (FIG. 7) for supporting the blade block 6. Blade block 6 consists of a strip 17 (FIG. 9), which has an essentially L-shaped cross-sectional profile. The L-shaped strip 17 includes legs 19 and 19a. Leg 19 includes individual, short strip portions 17' connected to one another by webs 18. Each strip 17' includes leg portions 19'. The webs 18 are constructed integrally with the strip portions 17', and are seated essentially in the central region of leg 19 so that an opening 20 is respectively left free above the webs 18, while the leg portions 19' have a free end.

The other leg 19a of the strip 17, serves to receive and fasten the two razor blades 5, 5'. Leg 19a is divided into leg portions 19a' which coincide with leg portions 19' of leg 19. The upper razor blade 5 is fastened in this arrangement to one side of the leg portion 19a, and the lower razor blade 5' is fastened to the opposite side of the leg portion 19a' so that the latter fulfill the function of a spacer 21 (FIG. 6). The two razor blades 5, 5' are aligned parallel to one another, while the cutting edges 9, 9' are offset with respect to one another. As may be seen in the front view in accordance with FIG. 9 of the blade block 6 and in the front view in accordance with FIG. 3 of the complete razor blade unit 1, openings 20 are left free between the leg portions 19a'.

To mount the razor blade unit, the blade block 6 is set from above onto the bottom part 3 in such a way that the underside of the lower razor blade 5' rests on the blade platform 16 defined by the support webs 8. Furthermore, the free ends of the leg portion 19' of the strip portions 17' are received in the longitudinal slots 14 of the bottom part 3. The blade block 6 is thus fixed on or in the bottom part 3 of the plastic housing 2.

Figure 8:
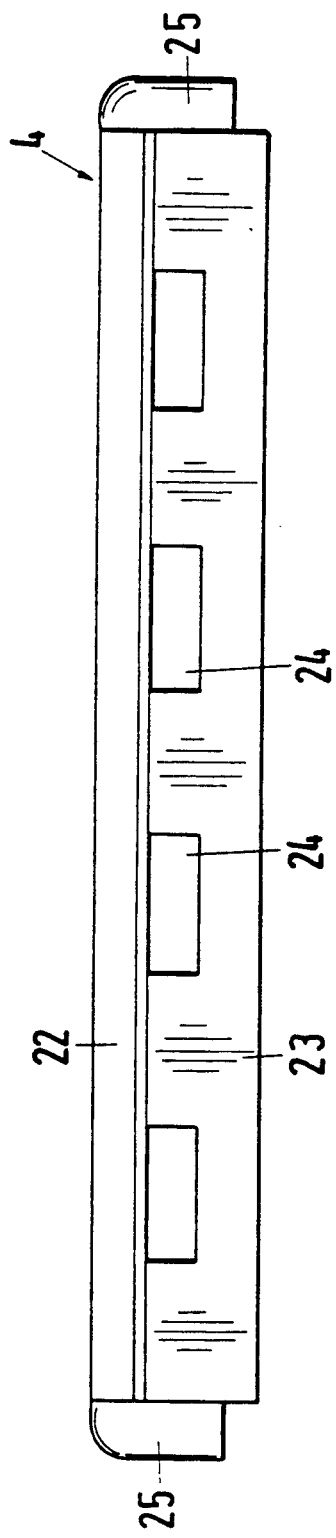
FIG. 8 is a front view of the top part of the plastic housing of the razor blade unit in the form of an alignment strip.

As illustrated in FIGS. 4 and 8, the alignment strip 4 serves to further fix the blade block 6 on bottom part 3. Strip 4 defines a cover cap 22 resting on the top side of the upper razor blade 5. A rear wall 23 is integrally formed with cover cap 22. Wall 23 has perforations 24, which are aligned with openings 20 constructed in the strip 17. The alignment strip 4 also has wings 25 (FIG. 1) integrally formed on both sides.

To form the complete razor blade unit 1, the alignment strip 4 is fitted onto the bottom part 3 from above. In this process, the rear wall 23 of the alignment strip 4 lies flat on the rear wall 13 of the bottom part 3, and the underside of the wings 25 of lie flat on the side walls 15 of the bottom part 3. The alignment strip 4 and the bottom part 3 can then be permanently connected by bonding, ultrasonic welding, or frictionally engaging parts.

The cover cap 22 defined by the alignment strip 4 can, in addition, further be provided with a friction-reducing coating which, for example, may be made of a photoresist or a polymer.

The bent strip 17 for the spacer 21 with the openings 20, which define flow-through channels, permits the production of a blade with narrow cutting edges. Together with perforations 24 in the alignment strip, openings 20 and perforations 12 in the bottom part 3, guarantee a better flow through the housing and an improved and simpler cleaning operation.

The form of the strip 17 is selected so that there is no greater use of material overall than in the case of spacers that are not bent. This is achieved when strip 17 has the form of interlocking rakes. The particular advantage of this embodiment is that despite openings between the razor blades 5,5', the strip 17 and thus the spacer 21 form a stable unit with the razor blades 5,5' due to the bent form. The invention has the advantage of using alignment strip 4 as an additional covering of the blades in the form of a cover cap 22.

What is claimed is:

1. A shaver head for a wet shaver, comprising:
   at least one razor blade having a cutting edge;
   a plastic housing for supporting said blade, the housing including a front guide strip and a front portion from which the cutting edge of the blade extends, a rear portion, an underside portion, an open region located in the front portion of the plastic housing near the cutting edge of the blade, a strip having two legs arranged in an essentially L-shaped cross-sectional profile, the blade being fastened parallel to one of the legs, the other leg having short strip portions connected by web portions and separated by openings, and perforations located both in the underside portion and the rear portion of the plastic housing, the perforations being connected to the open region of the plastic housing, and the openings being aligned with the perforations formed in the rear portion of the plastic housing.

2. The shaver head as claimed in claim 1, wherein the guide strip has a rear side and a top side, and the rear side of the guide strip is beveled backwards starting from the top side.

3. The shaver head as claimed in claim 1 wherein the legs of the L-shaped strip are perpendicular to each other.

4. The shaver head as claimed in claim 1, wherein the strip portions are connected to one another in a region of the free end of the legs by the web portions.

5. The shaver head as claimed in claim 1, wherein the plastic housing is provided with a friction reducing coating.

6. The shaver head as claimed in claim 1, wherein the front guide strip is connected to the remainder of the plastic housing by webs which define the perforations in the underside portion.

7. The shaver head as claimed in claim 6, wherein the webs have a top side with recesses located in a region behind the guide strip.

* * * * *